US010230851B2

(12) United States Patent
Flaks et al.

(10) Patent No.: US 10,230,851 B2
(45) Date of Patent: *Mar. 12, 2019

(54) IDENTIFYING CALL FEATURES AND ASSOCIATIONS TO DETECT CALL TRAFFIC PUMPING AND TAKE CORRECTIVE ACTION

(71) Applicant: Marchex, Inc., Seattle, WA (US)

(72) Inventors: Jason Flaks, Redmond, WA (US); Iroro Orife, Seattle, WA (US); Bryan Rieger, Seattle, WA (US); Ryan O Rourke, Seattle, WA (US); Shane Walker, Kent, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,682

(22) Filed: Oct. 31, 2016

(65) Prior Publication Data

US 2017/0149984 A1 May 25, 2017

Related U.S. Application Data

(63) Continuation of application No. 14/721,912, filed on May 26, 2015, now Pat. No. 9,485,354.

(Continued)

(51) Int. Cl.
*H04M 1/66* (2006.01)
*H04M 15/00* (2006.01)
(Continued)

(52) U.S. Cl.
CPC ......... *H04M 15/47* (2013.01); *H04M 3/2281* (2013.01); *H04M 3/367* (2013.01);
(Continued)

(58) Field of Classification Search
CPC ................ H04M 15/00; H04M 15/47; H04M 2215/0148; H04M 15/58;
(Continued)

(56) References Cited

U.S. PATENT DOCUMENTS 8,538,379 B1 * 9/2013 Stachiw ................ H04M 15/43
379/114.01
8,874,144 B1 * 10/2014 Liu ........................ H04W 4/02
455/456.1

(Continued)

*Primary Examiner* — Ahmad F. Matar
*Assistant Examiner* — Jirapon Intavong
(74) *Attorney, Agent, or Firm* — Perkins Coie LLP

(57) ABSTRACT

A system and method for monitoring telephone calls to detect call traffic pumping activity and take corrective action is described. The system receives a group of training telephone calls having associated call audio content and associated information, and the system analyzes the training telephone calls to generate and store a classification model that correlates call features and associations with a probability of call traffic pumping activity. The system receives a subsequent monitored telephone call to be analyzed. The system analyzes the monitored telephone call to identify features present in the audio content of the monitored telephone call and other associated information. The system then compares the features and associated information to the stored classification model in order to determine a probability that the monitored telephone call is associated with call traffic pumping activity. If the assessed probability of call traffic pumping activity exceeds a threshold, the system takes appropriate corrective action, such as terminating or flagging the monitored call.

20 Claims, 9 Drawing Sheets

Related U.S. Application Data

(60) Provisional application No. 62/159,086, filed on May 8, 2015.

(51) Int. Cl.
*H04M 3/36* (2006.01)
*H04M 3/22* (2006.01)
*H04M 7/00* (2006.01)

(52) U.S. Cl.
CPC ......... *H04M 7/0078* (2013.01); *H04M 15/50* (2013.01); *H04M 15/58* (2013.01); *H04M 3/2263* (2013.01); *H04M 2203/6027* (2013.01); *H04M 2215/0148* (2013.01)

(58) Field of Classification Search
CPC ......... H04M 2215/0188; H04M 15/41; H04M 2215/0164; H04M 2215/32; H04M 2215/2026
USPC .................................................... 379/201.01
See application file for complete search history.

(56) References Cited

U.S. PATENT DOCUMENTS

| | | | |
|---|---|---|---|
| 9,167,078 B2 * | 10/2015 | Spievak ................ | H04M 3/436 |
| 2005/0180547 A1 * | 8/2005 | Pascovici ................ | G10L 17/04 |
| | | | 379/88.01 |
| 2014/0119527 A1 * | 5/2014 | Cohen ................ | H04M 3/4365 |
| | | | 379/207.13 |

\* cited by examiner

IDENTIFYING CALL FEATURES AND ASSOCIATIONS TO DETECT CALL TRAFFIC PUMPING AND TAKE CORRECTIVE ACTION

CROSS-REFERENCE TO RELATED APPLICATION(S)

This application is a continuation of U.S. patent application Ser. No. 14/721,912 entitled "IDENTIFYING CALL FEATURES AND ASSOCIATIONS TO DETECT CALL TRAFFIC PUMPING AND TAKE CORRECTIVE ACTION," filed on May 26, 2015, which claims the benefit of priority to U.S. Provisional Patent Application No. 62/159,086 entitled "IDENTIFYING CALL COMPONENTS TO DETECT CALL TRAFFIC PUMPING AND TAKE CORRECTIVE ACTION WITHOUT USING RECORDING, TRANSCRIPTION OR CALLER ID," filed on May 8, 2015, the disclosures of which are incorporated herein by reference in their entireties.

BACKGROUND

In the United States, telecommunications laws such as the Telecommunications Act of 1996 provide for long distance telephone companies to compensate local telephone companies (also known as local exchange carriers (LECs)) for long distance telephone calls that are routed across a LEC's network. For example, when a user in California places a toll-free long distance call to a call recipient in New York, the telephone call may be routed from a first LEC in California to a second LEC in Utah, to a third LEC in Kansas, to a fourth LEC in Illinois, and so on until the call is eventually routed to a LEC located near the call recipient in New York. Under United States law, each LEC between California and New York receives payment from the long distance telephone company (called an intercarrier compensation fee) for routing the long distance telephone call, with the rural LECs (for example, a LEC in New Harmony, Utah or Grenola, Kans.) receiving higher compensation than LECs located in more urban areas (for example, a LEC in Los Angeles, Calif. or Chicago, Ill.).

For certain LECs—particularly those located in rural areas—the lucrative nature of intercarrier compensation fees has led to a practice known as traffic pumping. Traffic pumping occurs when a LEC causes a large number of long distance calls to be routed across the LEC's network in order to receive the benefit of addition intercarrier compensation fees. The corresponding increase in volume of traffic pumping calls has myriad negative effects on long distance telephone companies and well as companies across various industries that receive long distance phone calls. For example, both long distance telephone companies and companies that receive long distance telephone calls ultimately bear the expense associated with paying higher intercarrier compensation fees to LECs. In addition, companies that rely on the ability to receive long distance calls suffer from receiving a higher number of nuisance calls. For example, a nuisance call may be an automated call made by a non-human actor (such as a computer system) whose goal is not to communicate with the agent but rather to increase the duration of the phone call as long as possible in order to maximize intercarrier compensation fees.

Previous attempts at detecting and preventing traffic pumping calls have proven ineffective in part because calls that are associated with traffic pumping activity often are associated with fake (or "spoofed") caller identification information, thereby making it difficult to detect traffic pumping based on caller identify. Moreover, because only limited information is typically passed between various LECs as a long distance call is routed from the caller to the call recipient, it is difficult and time-consuming to trace traffic pumping activity to a source by analyzing call activity records associated with multiple involved LECs. Therefore, a need exists to detect and take corrective action to calls associated with traffic pumping activity in an efficient and timely manner.

DETAILED DESCRIPTION

Figure 1:
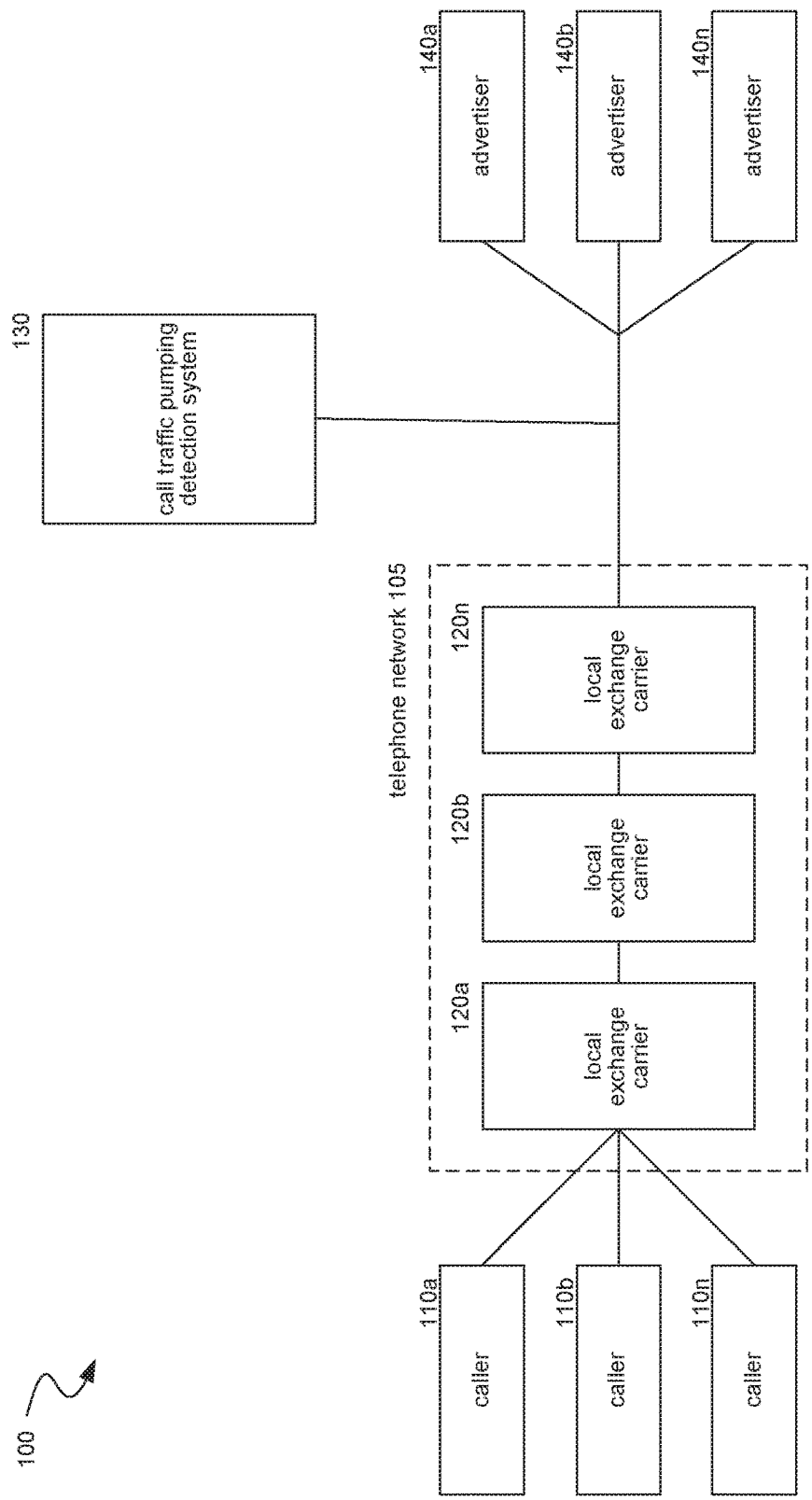
FIG. 1 is a block diagram illustrating an environment in which a call traffic pumping detection system operates in some embodiments.

A system and method that monitors one or more telephone calls to detect call traffic pumping activity and take corrective action is disclosed. The system analyzes a group of training telephone calls to identify features and associations that are indicative of a probability of call traffic pumping, uses the identified call features and call associations to train a classification model to detect call pumping activity, and applies the classification model to one or more subsequent telephone calls to detect a probability of call traffic pumping activity in the one or more subsequent telephone calls. The system thereby learns characteristic features that imply a non-human actor, recording or artificial environment, that are not commonly found in regular customer-initiated call audio. The analysis of the one or more subsequent telephone calls excludes the use of caller ID and excludes the analysis of a recording or transcription of the one or more subsequent telephone calls. By avoiding call recording or transcription of the one or more subsequent telephone calls, the system advantageously avoids many general privacy concerns of the public that may otherwise arise when recording or transcribing certain personal information such as Social Security Numbers, credit card numbers, bank account numbers, passport numbers, physical street addresses, Protected Health Information (PHI), or other Personally Identifiable Information (PII). Additional information regarding these concerns, as well as other advantages of analyzing one or more subsequent telephone calls without recording or transcription, is described in U.S. patent application Ser. No. 14/045,118, entitled "SYSTEM AND METHOD FOR ANALYZING AND CLASSIFYING CALLS WITHOUT TRANSCRIPTION VIA KEYWORD SPOTTING," filed on Oct. 3, 2013, and incorporated herein by reference in its entirety. When the call traffic pumping detection system determines that the probability that a monitored call is associated with traffic pumping activity exceeds a threshold, the system takes corrective action with respect to the monitored call, as described in more detail below. As used herein, the term "telephone call," "phone call," or "call" refers to any voice communication placed or received via a telecommunications network (e.g., Public Switched Telephone Network (PSTN), other wireline network, or wireless network) or Internet Protocol-based communication network (e.g., Voice over Internet Protocol (VoIP)).

In order to train a classification model to detect call pumping activity, the call traffic pumping detection system analyzes a group of training telephone calls. In particular, each call in the group of training telephone calls is known or believed to be associated with traffic pumping activity, or is known or believed to be associated with activity that is not indicative of traffic pumping. The group of training telephone calls may be associated with a particular advertiser and/or with a particular distribution channel. An advertiser may correspond to an individual company or entity, such as a corporation, bank, hospital, school, coffee shop, or a particular department or subgroup thereof (e.g., a selected advertiser may be a credit department or an investment services department within the same bank). A distribution channel may correspond to any physical or electronic medium through which a given telephone number is advertised. For example, a distribution channel may correspond to a banner advertisement that displays a telephone number on a website, a radio or television advertisement that displays or announces a telephone number, or a physical billboard advertisement that displays the telephone number. In other words, the system may analyze a group of training telephone calls from an advertiser (e.g., a bank) and/or from a particular channel (e.g., a television advertisement). The system may also perform the analysis without regard to any particular advertiser or distribution channel associated with the calls, thereby allowing for greater flexibility in tailoring the call traffic pumping detection to suit the specific needs of one or more entities that are impacted by call traffic pumping activity.

The system trains a traffic pumping classification model by applying one or more statistical processing techniques to the training telephone calls in order to identify one or more sets of features and associations that are indicative of a likelihood of traffic pumping activity. As explained in more detail below, a feature may correspond to one or more characteristics present in the audio stream of a telephone call, such as spectral components. Associations may correspond to any information that is known or believed to be known about a telephone call, including an associated advertiser, distribution channel, call time or date, or call duration. A person of ordinary skill in the art will appreciate that features and associations may comprise additional types of information not specifically described herein. The statistical processing techniques used to identify the one or more sets of features and associations may use scoring functions or machine learning algorithms to identify features and associations that are indicative of a probability of call traffic pumping activity. Such scoring functions or machine learning algorithms may include, but are not limited to, logistic regression, support vector machines, neural networks, Bayesian models, Naive Bayes models, Hidden Markov models, Random Forest models, or Gaussian mixture models.

The identified likelihood of traffic pumping activity may be expressed in a variety of different ways. For example, the system may calculate a probability in the range of 0.0 to 1.0 corresponding to a likelihood that a particular received call having certain features or associations is indicative of traffic pumping. On such a scale, for example, the likelihood that a particular call is associated with traffic pumping activity increases as the value approaches 1 and the likelihood that the call is not associated with traffic pumping activity increases as the value approaches 0. Using the same scale, values hovering near 0.5 may correspond to calls that are indeterminate (i.e., calls that do not indicate traffic pumping activity and do not indicate the absence of traffic pumping activity). A person of ordinary skill in the art will appreciate that other scales are possible, including scales that represent the degree of likelihood of traffic pumping activity in positive numbers only, negative numbers only, or as positive or negative percentages. The system may express a calculated probability as a percentage, positive number, negative number, fraction, or any identifier falling on any of various numerical or non-numerical scales.

As explained in more detail below and with respect to FIG. 7, a generated traffic pumping classification model maps a probability of traffic pumping activity for a received telephone call to a set of features (e.g., advertiser or distribution channel) and/or associations (e.g., advertiser, distribution channel, call time or date, or call duration) pertaining to the received telephone call. The system stores the generated traffic pumping classification model to later assist the system with correlating future received (or "monitored") telephone calls to a probability of traffic pumping activity and take appropriate corrective action when necessary.

Subsequent to training the classification model, the system receives one or more telephone calls (i.e., a "received call" or "monitored call") to assess for potential traffic pumping activity. The system analyzes the one or more received telephone calls to identify one or more features (e.g., spectral components, a particular frequency, or a range of frequencies) that are present in the audio stream of the monitored call and which reflect a likelihood of traffic pumping activity as modeled by the traffic pumping classification model. The system may analyze audio from any portion of the monitored call, including for example audio of the entire monitored phone call, audio at a beginning portion of the monitored call (e.g., the first two or three seconds at the beginning of the monitored phone call), and including audio that may be perceived as silence by a human listener. In addition to identifying features present in the audio stream of the monitored call, the system may identify additional information such as an advertiser or distribution channel that are associated with the monitored call (i.e., call associations). By analysis against the classification model, the system compares the identified components in the audio stream of the monitored call and, optionally, the identified associations of the monitored call with the stored traffic pumping classification model. Based on the comparison, the system identifies the likelihood of whether the monitored call is associated with traffic pumping activity.

The system may take corrective measures based on the identified probability of traffic pumping. For example, if the system determines that a monitored telephone call is indicative of traffic pumping activity, the system may terminate the call, present an authentication challenge to the caller (e.g., prompting the caller to provide a response to an Interactive Voice Response system), blacklisting telephone calls from the responsible entity, or flagging the call as a potential traffic pumping call before forwarding the call to the intended recipient. Additionally or alternatively, the system may identify a distribution channel (e.g., a particular advertised telephone number) associated with a traffic pumping call and take any number of actions with respect to the applicable distribution channel, including flagging the distribution channel for heightened monitoring or disabling call activity associated with the distribution channel.

FIG. 1 is a block diagram illustrating a representative environment 100 in which a call traffic pumping detection system 130 operates. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

Referring to the example of FIG. 1, the call traffic pumping detection system 130 monitors or assesses traffic that is being carried from one or more callers 110 (shown individually as callers 110a-110n) via telephone network 105 to advertisers 140a-140n. Telephone network 105 comprises a series of interconnected local exchange carriers (LECs) (shown individually as LECs 120a-120n) that are capable of routing a call over a long distance (e.g., from New York to Los Angeles). Each individual LEC is capable of receiving a telephone call from a caller of from another local exchange carrier, and is capable of forwarding the call to another local exchange carrier (or to the intended call recipient if the LEC serves the intended call recipient). The call traffic pumping detection system 130 is communicably coupled to one or more advertisers 140 (shown individually as advertisers 140a-140n) and telephone network 105 such that the call traffic pumping detection system is capable of monitoring call traffic or assessing call traffic. A caller 110 may be an individual person, a business, a governmental agency, a spamming entity, or any other entity capable of initiating telephone calls for any reason, including calls initiated in response to advertisements for products or services and including calls that are not placed in response to advertisements for products or services. An advertiser 140 similarly may be an individual person, a business, a governmental agency, or any other entity capable of receiving telephone calls, including telephone calls that are received in response to advertisements that are placed by the advertiser. The call traffic pumping detection system 130 is capable of monitoring telephone calls from the callers 110 to the advertisers 140, and may analyze such calls (i.e., "received calls" or "monitored calls") to determine whether the calls are associated with traffic pumping activity and take corrective action if necessary. Telephone network 105 is a telephone network, such as a Public Switched Telephone Network (PSTN), capable of communicably coupling the callers 110, the advertisers 140, and the call traffic pumping detection system 130. A person of ordinary skill will appreciate that telephone network 105 may be any other suitable network that can carry data and/or voice telecommunications over a long distance.

The call traffic pumping detection system 130 may provide an interface such as a website that allows system users to access the call traffic pumping detection system 130, and which provides data regarding the call traffic pumping detection services and functions. In addition, one or more publishers may provide content that displays or uses call tracking phone numbers provided from a call tracking system (not shown) to enable callers to call advertisers. More information regarding call tracking systems may be found in U.S. Pat. No. 8,259,915, entitled "SYSTEM AND METHOD TO ANALYZE CALLS TO ADVERTISED TELEPHONE NUMBERS," filed on Jul. 1, 2010, which is incorporated herein by reference in its entirety.

The callers 110 and advertisers 140 may have mobile devices and computers that are used for communicating with each other through the telephone network 105. Any mobile devices may communicate wirelessly with a base station or access point using a wireless mobile telephone standard, such as the Global System for Mobile Communications (GSM), Long Term Evolution (LTE), or another wireless standard, such as IEEE 802.11, and the base station or access point may communicate with the call traffic pumping detection system 130 via the network 105. Computers may communicate through the network 105 using, for example, TCP/IP protocols.

Figure 2:
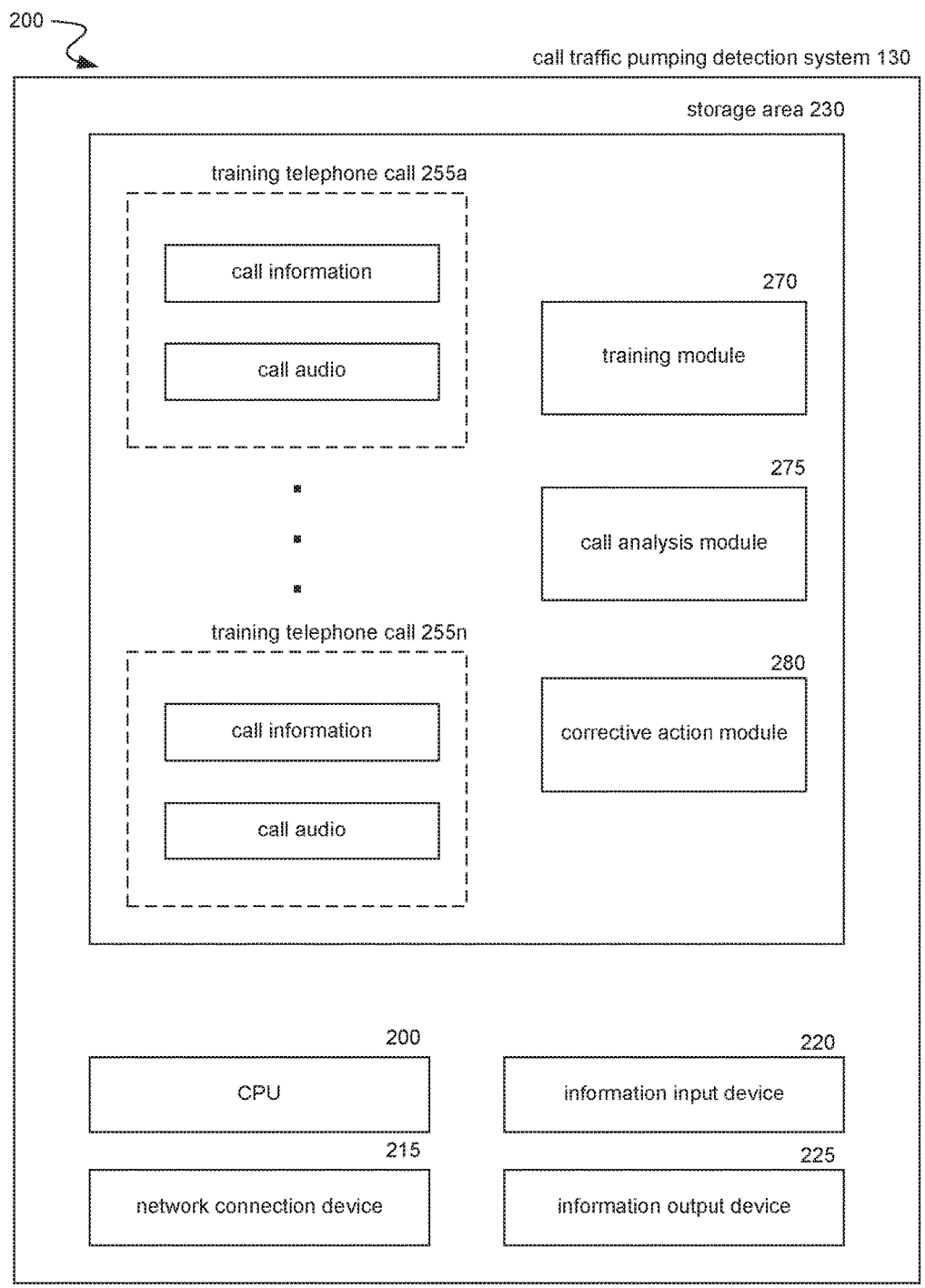
FIG. 2 is a block diagram illustrating the call traffic pumping detection system in more detail.

FIG. 2 is a block diagram 200 illustrating the call traffic pumping detection system 130 in more detail. The call traffic pumping detection system 130 includes a storage area 230.

The storage area 230 includes software modules and data that, when executed or operated on by a processor, perform certain of the methods or functions described herein. The storage area may include components, subcomponents, or other logical entities that assist with or enable the performance of some or all of these methods or functions. For example, the modules may in some embodiments be utilized to implement a training module 270 to generate a traffic pumping classification model based on a group of training telephone calls; a call analysis module 275 to analyze a received call against the generated traffic pumping classification model to determine a probability that the received call is associated with traffic pumping activity; and a corrective action module 280 to determine whether the determined probability of traffic pumping activity exceeds a threshold and take appropriate corrective action if the threshold has been exceeded. Storage area 230 also includes one or more training telephone calls 255 (shown individually as training calls 255a-255n), each of which contains call associations and call audio associated with the telephone call. A person of ordinary skill will appreciate that storage area 230 may be volatile memory, non-volatile memory, a persistent storage device (for example, an optical drive, a magnetic hard drive, a tape of a tape library, etc.), or any combination thereof.

The call traffic pumping detection system 130 further includes one or more central processing units (CPU) 210 for executing software stored in the storage area 230, and a computer-readable media drive for reading information or installing software from tangible computer-readable storage media, such as a floppy disk, a CD-ROM, a DVD, a USB flash drive, and/or other tangible computer-readable storage media. The call traffic pumping detection system 130 includes a network connection device 215 for connecting to a network, thereby enabling the call traffic pumping detection system 130 to monitor call traffic between callers 110 and advertisers 140. Network connection device 215 further enables a system operator to communicate with the call traffic pumping detection system 130 to provide one or more training telephone calls for use in generating a classification model, to specify one or more thresholds for taking corrective action, or to monitor the operation of the system or obtain related operational statistics. The call traffic pumping detection system 130 also includes an information input device 220 (e.g., a mouse, a keyboard, etc.) and an information output device 225 (e.g., a display).

Figure 3:
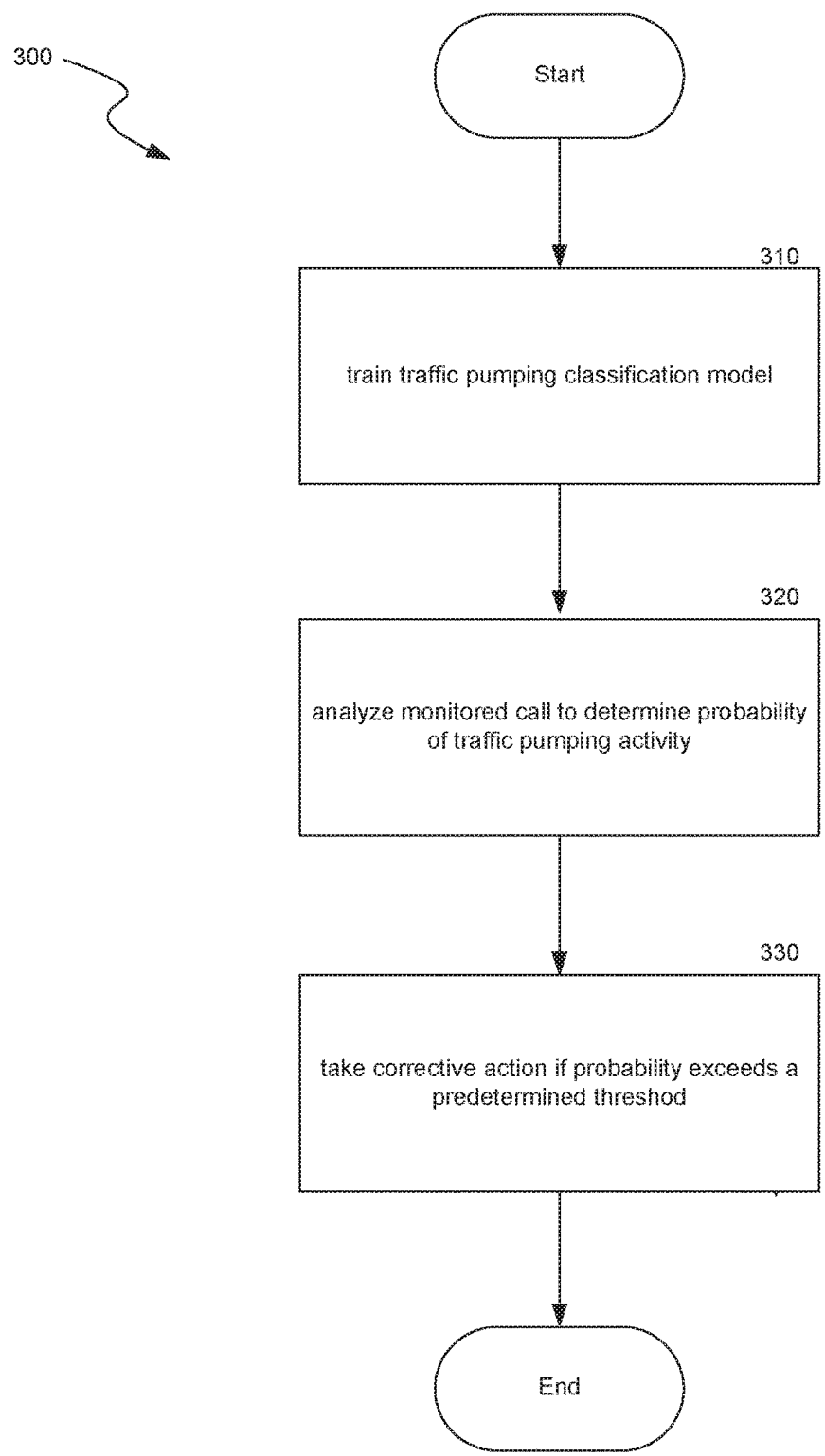
FIG. 3 is a flowchart showing an overview of a method implemented by the call traffic pumping detection system to detect call traffic pumping activity and take corrective action with respect to a received call without using recording, transcription, or caller ID in connection with the received call.

FIG. 3 is a flowchart showing an overview of a method implemented by call traffic pumping detection system 130 to detect traffic pumping activity associated with one or more telephone calls and take corrective action. At step 310, the system trains a call traffic pumping classification model. The system receives a group of training telephone calls, extracts features from the audio signals of the training telephone calls, and identifies additional information that is associated with the training telephone calls. The system supplies the extracted features and the identified associated information to a training module, which then generates a traffic pumping classification model that correlates various combinations of features and associations to a probability that the features and associations reflect traffic pumping activity. Additional details regarding the training of the call traffic pumping classification model are provided below with respect to FIGS. 4-7. At step 320, the system receives a subsequent telephone call to assess and analyzes the telephone call to determine a probability that the received call is associated with traffic pumping activity. The system extracts features from the audio signal of the received telephone call and identifies additional information that is associated with the received telephone call. The system compares the extracted features and identified associations from the received telephone call to the previously generated call traffic pumping detection model. Based on the comparison, the system determines a probability that the received telephone call is associated with call traffic pumping activity. Additional details regarding the analysis of a received telephone call are provided below with respect to FIGS. 8-9. At step 330, the system takes a corrective action if the determined probability of traffic pumping activity exceeds a threshold, as discussed below in more detail with respect to FIG. 8.

Figure 4:
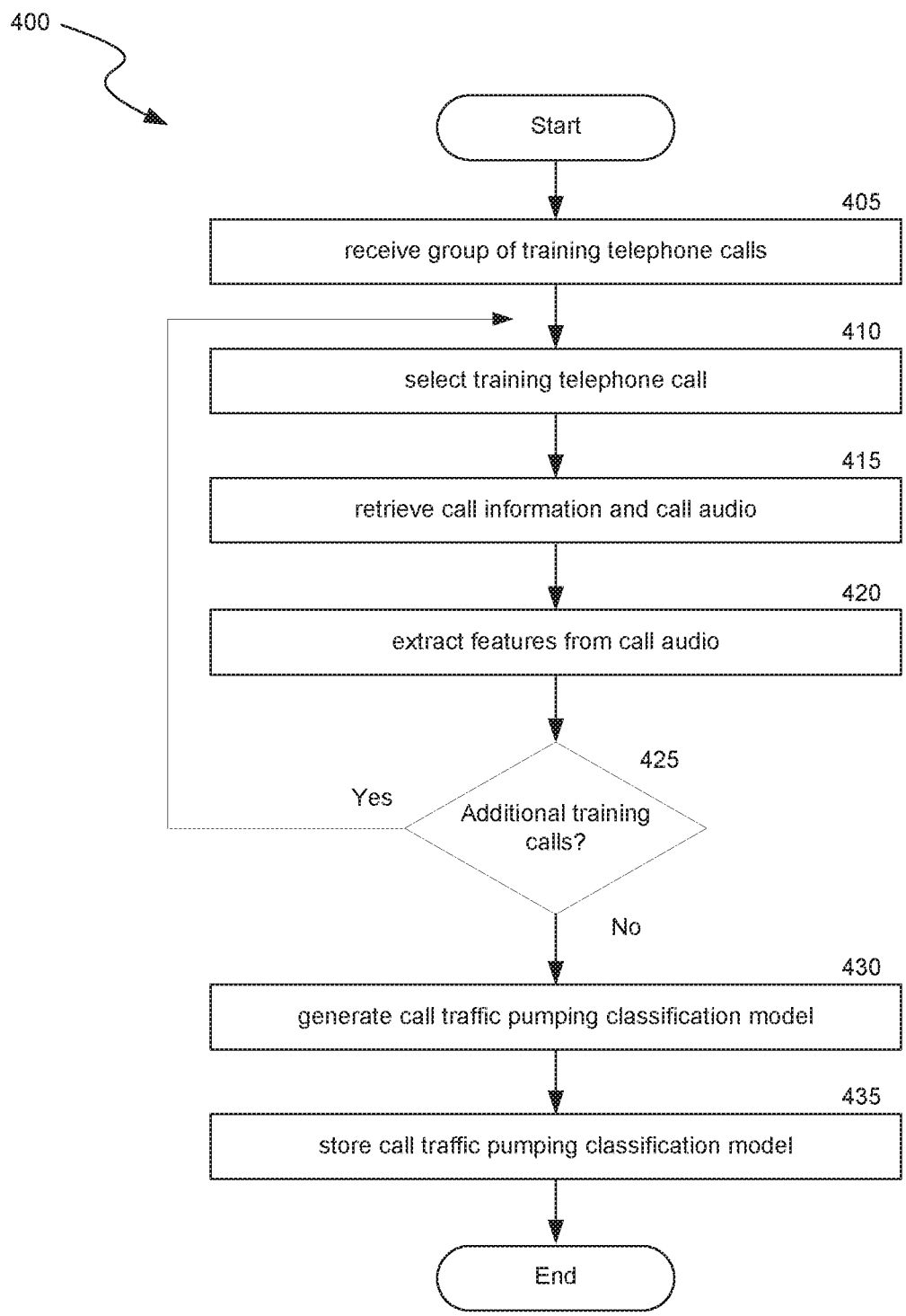
FIG. 4 is a flowchart showing a method implemented by the call traffic pumping detection system to train a classification model for use in analyzing a subsequent monitored telephone call.

FIG. 4 is a flowchart showing a method implemented by call traffic pumping detection system 130 to train a classification model for use in analyzing a subsequent monitored telephone call. At step 405, the system receives a group of training telephone calls. The group of training calls may include telephone calls that are known or believed to be associated with call traffic pumping activity, as well as telephone calls that are known or believed to be associated with activity that is not indicative of call traffic pumping. Each training telephone call in the group of training telephone calls may comprise multiple audio channels, for example an audio channel associated with a caller and an audio channel associated with a call recipient. When receiving the training telephone calls, the system also receives full or partial audio of each training telephone call. In addition, the system may receive one or more call associations for all calls in the group of training calls or a subset of calls in the group of training calls. Such call associations may include, but are not limited to, an identification of an associated advertiser (i.e., an advertiser who placed or received the telephone call), an identification of an associated distribution channel (e.g., a website, online advertisement, search engine result, billboard advertisement, print advertisement, radio or television advertisement, etc.), an associated day or time (e.g., 4:15 p.m. on Jan. 15, 2015), or an associated call duration (e.g., 45 minutes). A person of ordinary skill will appreciate that received training telephone calls may contain additional information or may contain less information. For example, one or more telephone calls in the group of training telephone calls may omit advertiser or distribution information. Similarly, one or more telephone calls in the group of training telephone calls may include any number and type of additional information that is not specifically disclosed herein.

Figure 5:
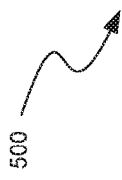
FIG. 5 is a table illustrating a group of training telephone calls that is received by the call traffic pumping detection system for use in generating a call traffic pumping classification model.

FIG. 5 is a table illustrating a group of training telephone calls that is received by the call traffic pumping detection system for use in generating a call traffic pumping classification model. Table 500 contains multiple columns corresponding to various information that may be received for each training telephone call in the group of training telephone calls: column 510, labeled "Advertiser," contains data which identifies the advertiser that placed or received each respective training telephone call; column 515, labeled "Distribution Channel," contains data that identifies the distribution channel associated with each respective training telephone call; and column 520, labeled "Call Traffic Pumping Activity," contains data which includes an indication of whether each respective training telephone call is known or believed to be associated with call traffic pumping activity (e.g., a "Yes" value) or is not known or believed to be associated with call traffic pumping activity (e.g., a "No" value). The audio sample may be in any suitable format (e.g., MPEG Audio Layer III (MP3), Advanced Audio Coding (AAC), Windows Media Audio (WMA)), and may be sampled, compressed, etc.

The example of Table 500 illustrates a group of training telephone calls used by the system to generate a call traffic pumping classification model. For example, training telephone call 550a is associated with advertiser "Oak Cleaners" and distribution channel "radio_ad_1," and is known or believed to be associated with call traffic pumping activity. Training call 550b is also known or believed to be associated with call traffic pumping activity, is also associated with advertiser "Oak Cleaners," and is associated with distribution channel "billboard_3" rather than "radio_ad_1." Training call 550c is not associated with any particular advertiser or distribution channel, and is not known or believed to be associated with call traffic pumping activity. Training call 550d is not associated with any particular advertiser, but is associated with a particular distribution channel (i.e., "yellow_page_ad_4") and is known or believed to be associated with call traffic pumping activity. Training call 550e is associated with advertiser "Comfort Dental," but is not associated with a particular distribution channel and is not known or believed to be associated with call traffic pumping activity. Training call 550n is associated with advertiser "Speedy Clean" and distribution channel "tv_ad_17," and is known or believed to be associated with call traffic pumping activity. The identification of call traffic pumping activity in the training calls may be reported by an advertiser based on manual identification of received calls or by network operators based on unusual patterns of observed traffic.

Although Table 500 depicts five columns of information, a person of ordinary skill in the art will appreciate that Table 500 may contain columns of information in addition to those shown (including, for example, the telephone number that was dialed, the context in which the telephone number was dialed, the date or time of day that the telephone number was dialed, the duration of the telephone call, etc.). A person of ordinary skill further will appreciate that Table 500 may omit certain information for a particular telephone call while including other information for the call (e.g., Table 500 may include advertiser information but omit distribution information for a telephone call, or may include distribution information but omit advertiser information for a telephone call). Although Table 500 contains telephone calls corresponding to multiple advertisers and multiple distribution channels, a person of ordinary skill will appreciate that separate tables may be compiled on a per-advertiser or per-distribution channel basis.

Figure 6:
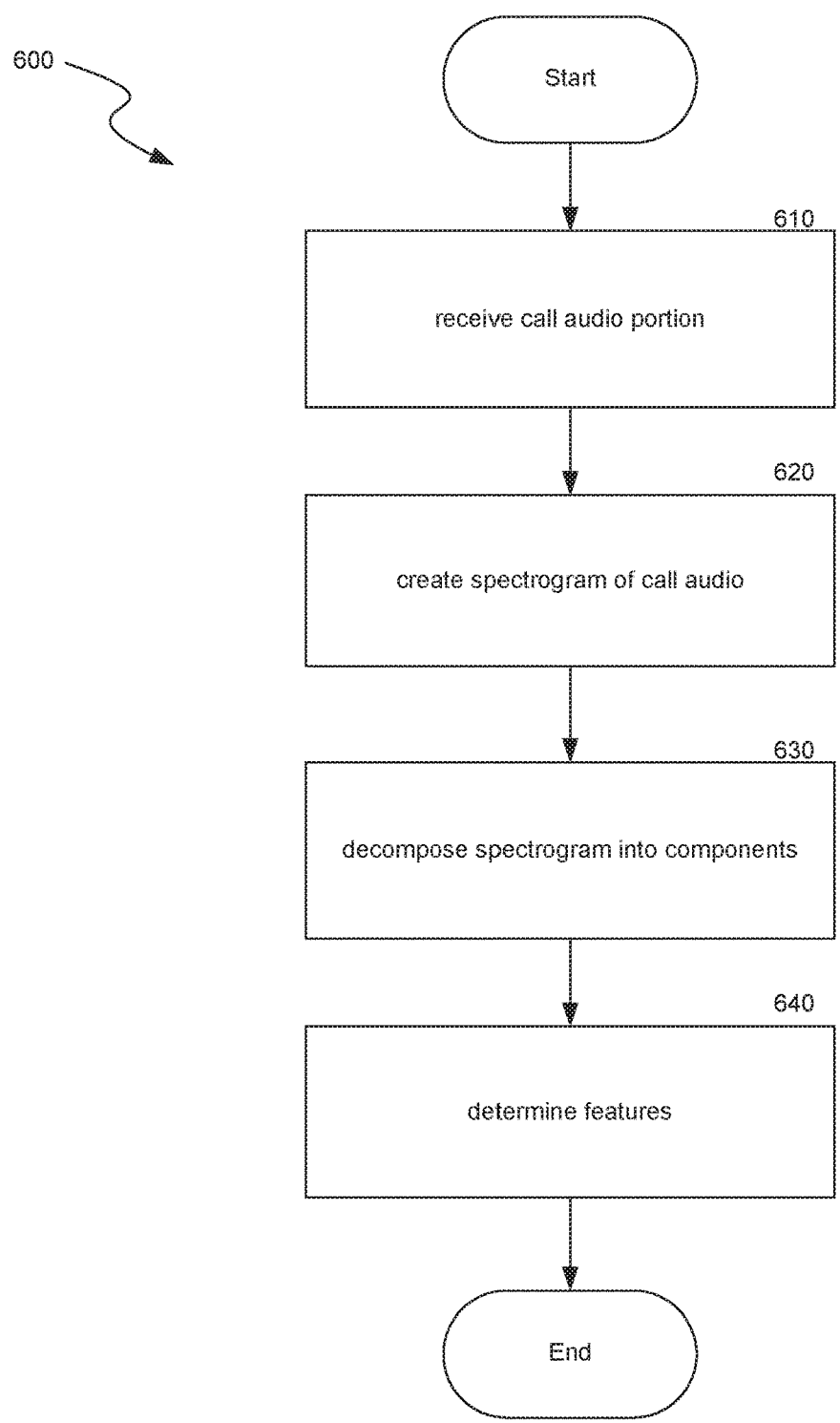
FIG. 6 is a flowchart showing a method implemented by the call traffic pumping detection system to extract one or more features from an audio stream of a telephone call.

Returning to FIG. 4, at step 410, the system selects an individual training telephone call from the group of training telephone calls. At step 415, the system retrieves one or more call associations that pertain to the selected training telephone call. The system also retrieves all or a portion of the call audio associated with the call. At step 420, the system extracts one or more features from an audio stream of the selected training telephone call. FIG. 6 is a flowchart showing a method implemented by the call traffic pumping detection system to extract one or more features from an audio stream of a telephone call. At step 610, the system receives audio content from a telephone call. At step 620, the system generates a spectrogram from the audio content from the telephone call, for example by using a Fast Fourier Transform of the audio content. At step 630, the system decomposes the generated spectrogram into multiple components. Each of the multiple components may correspond to a characteristic of the audio content, for example a characteristic frequency (in magnitude). Collectively, each of the multiple components comprise the frequency or spectral pattern of the audio content. At step 630, the system identifies the features of the received audio content by determining which of the multiple components are principal components. For example, the system may determine that the features of the audio component correspond to the top three principal components, the system may determine that the features of the audio component correspond to the top five principal components, or the system may determine that the features of the audio component correspond to a variable number of top principal components that is configurable by a system operator. By enabling a variable number of top principal components, the system enables an operator to configure the call traffic pumping detection system to meet particular design or performance objectives, including the ability to capture a desired percentage of total variance in the spectrograms, minimize computational expense, and optimize performance under a chosen statistical analysis model (e.g., Random Forest or Naive Bayes). Returning again to FIG. 4, at step 425, the system determines whether any additional training calls in the received group of training calls remain to be analyzed. If additional calls remain to be analyzed, the system repeats steps 410-420 for each additional training call until no more training calls remain to be analyzed.

When all training telephone calls in the group of received training telephone calls have been analyzed, the system proceeds to step 430 to generate a call traffic pumping classification model. To generate the classification model, the system performs statistical processing (e.g., scoring functions, machine learning algorithms including, but not limited to, logistic regression, support vector machines, neural networks, or Random Forest models) on the received call associations and extracted features from the training calls in the group of training calls. As a result of the statistical processing, the system at step 435 stores a call traffic pumping detection model that correlates various combinations of features and associations to a given probability of traffic pumping activity. A person of ordinary skill in the art will appreciate that the call traffic pumping classification model may be trained online or offline using batch or mini-batch updating schemes.

Figure 7:
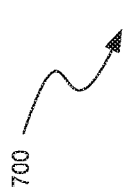
FIG. 7 is a table illustrating a generated call traffic pumping classification model in an embodiment.

FIG. 7 is a table 700 illustrating a generated call traffic pumping classification model in an embodiment. Table 700 contains columns corresponding to an advertiser (710); distribution channel (715); one or more features (720) present in the audio content of the telephone call (e.g., one or more characteristic frequency/spectral patterns or one or more designators such as p_17 or p_a3 that correspond to a characteristic frequency/spectral pattern); and a corresponding determined probability of traffic pumping activity (725). For example, entry 750a indicates that a call placed to Oak Cleaners via a telephone number that was advertised on any distribution channel (or no distribution channel) and that contains features p_17, p_32, and p_31 in the audio stream of call would have a 70% probability of being associated with call traffic pumping activity. Entry 750b indicates that a call placed to Oak Cleaners via a telephone number that was advertised on distribution channel "radio_ad_1" and that contains the features p_49 and p_17 would have a 20% probability of being associated with call traffic pumping activity. Entry 750c indicates that a call placed to Speedy Clean via a telephone number that was advertised on any distribution channel (or no distribution channel) and that contains feature p_34 would have a 10% probability of being associated with call traffic pumping activity. Entry 750d indicates that any received call, regardless of advertiser or distribution channel, that contains feature p_114 would have an 85% probability of being associated with call traffic pumping activity. Entry 750e indicates that a call placed to any advertiser via a telephone number that was advertised on distribution channel "billboard_3" and that contains features p_2, p_38, p_17, and p_109 would have a 35% probability of being associated with call traffic pumping activity. Entry 750*n* indicates that a call placed to any advertiser via a telephone number that was advertised on distribution channel "tv_ad_17" and that contains any (or no) features would have a 95% probability of being associated with call traffic pumping activity. While the probabilities in Table 700 may be generated using a Naive Bayes model, any other type of statistical technique could be used to calculate probabilities of call traffic pumping activity. For example, a Random Forest model could be used in which probabilities are calculated by traversing a series of pre-computed trees to arrive at leaf nodes. The probabilities of each leaf node are summed to determine the overall probability of call traffic pumping activity, which is then indicated in the Table.

A person of ordinary skill in the art will appreciate that, for any given entry in Table 700, column 720 may contain any number of features. Likewise, a person of ordinary skill will appreciate that Table 700 may contain any number of entries. In addition, a person of ordinary skill will appreciate that the probabilities of traffic pumping activity may be represented on any numeric scale, including, for example, numerical percentages, or positive numbers to indicate a higher probability of traffic pumping activity and negative numbers to indicate a lower probability of traffic pumping activity. Although FIG. 4 performs steps 405-430 in a fashion that may result in a single classification model 500 for telephone calls associated with multiple advertisers or distribution channels, a person of ordinary skill in the art will appreciate that steps 405-430 may be performed separately on a per-advertiser basis or a per-distribution-channel basis in order to generate a separate classification model 700 for each respective advertiser or distribution channel.

Figure 8:
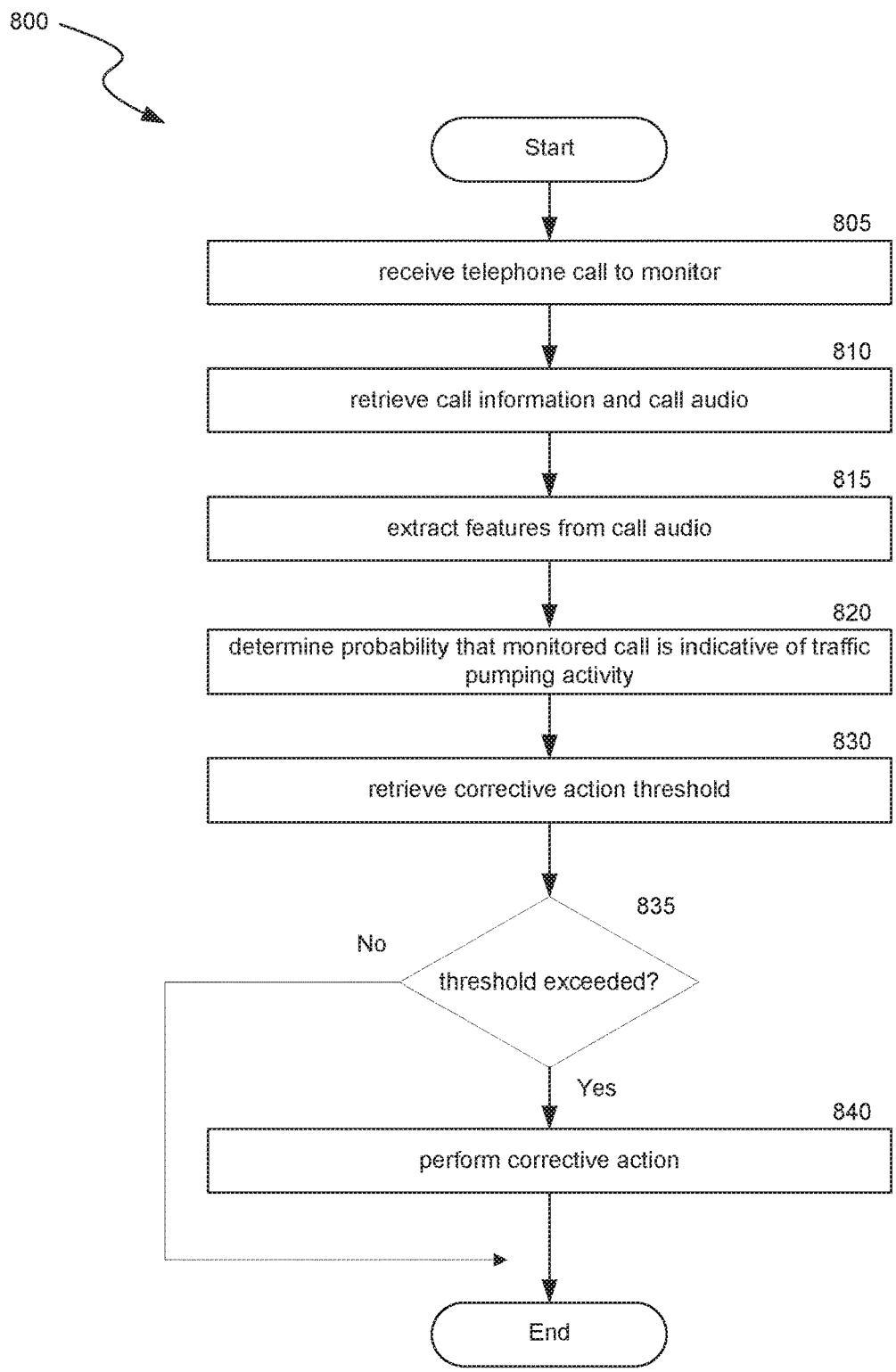
FIG. 8 is a flowchart showing a method implemented by the call traffic pumping detection system to analyze a subsequent telephone call.
Figure 9:
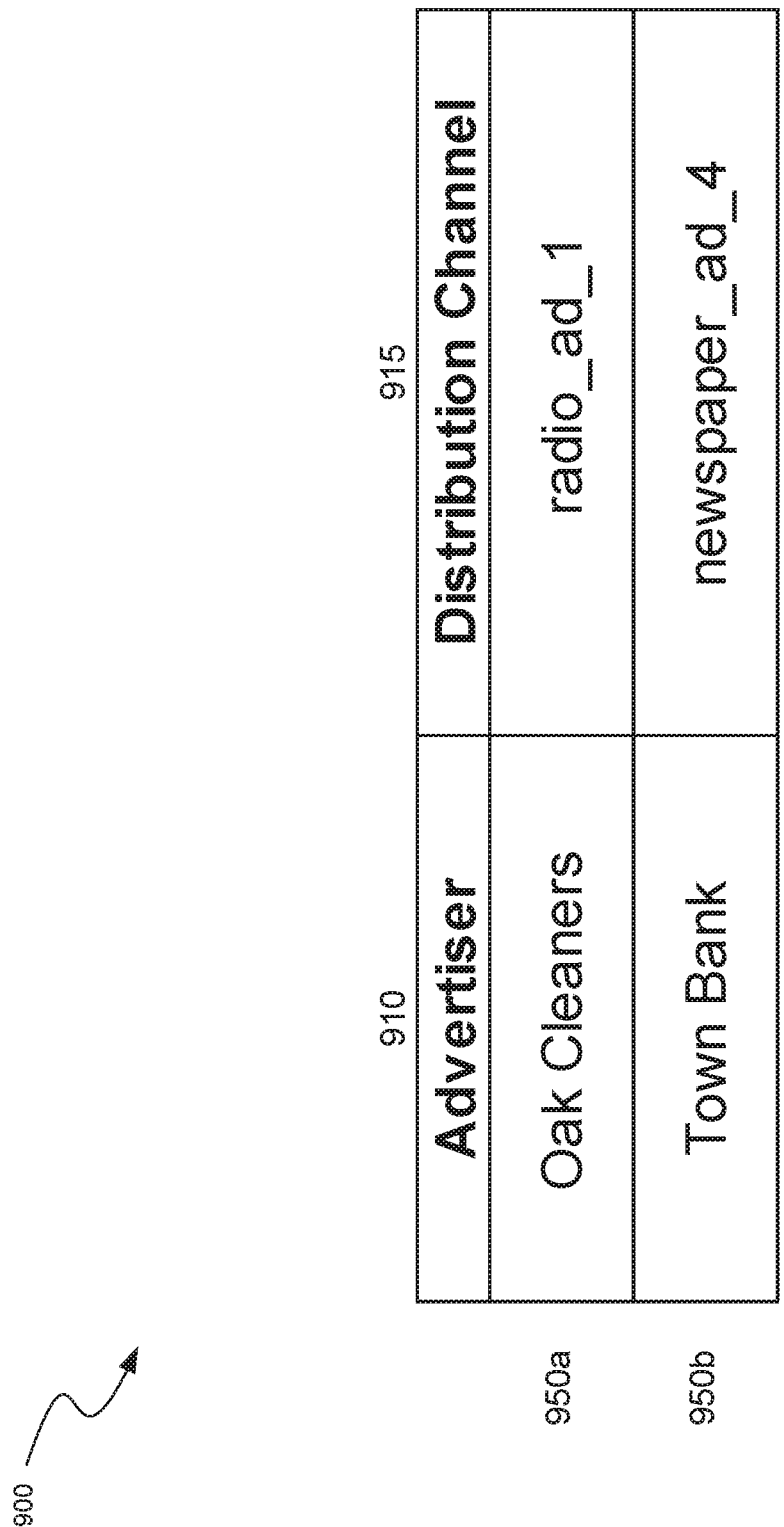
FIG. 9 is a table illustrating two example subsequent monitored telephone calls.

FIG. 8 is a flowchart showing a method implemented by call traffic pumping detection system 130 to analyze a subsequent telephone call (i.e., a "monitored telephone call") to detect call traffic pumping activity. At step 805, the system receives a telephone call to monitor. The monitored telephone call may be initiated by a caller under a variety of circumstances, including in response to viewing or hearing an associated telephone number in an advertisement via a distribution channel, or in response to a random telephone number generator or autodialer. The monitored telephone call may comprise multiple audio channels, for example an audio channel associated with a caller and an audio channel associated with a call recipient. When receiving the monitored telephone call, the system also receives full or partial audio of the monitored call. In addition, the system may receive one or more call associations for the monitored telephone call. Such call associations may include, but are not limited to, an identification of an associated advertiser (i.e., an advertiser who placed or received the telephone call), an identification of an associated distribution channel (e.g., a website, online advertisement, search engine result, billboard advertisement, print advertisement, radio or television advertisement, etc.), an associated day or time (e.g., 4:15 p.m. on Jan. 15, 2015), or an associated call duration (e.g., 45 minutes). FIG. 9 is a table illustrating two example monitored telephone calls, 950*a* and 950*b*. Table 900 contains column 910, labeled "Advertiser," which contains data that identifies the advertiser that placed or received each respective monitored telephone call. Table 900 also contains column 915, labeled "Distribution Channel," which contains data that identifies the distribution channel associated with each respective monitored telephone call. A person of ordinary skill will appreciate that a monitored telephone call may contain additional information or may contain less information. For example, the monitored telephone call may omit advertiser or distribution information, or may include any number and type of additional information that is not specifically disclosed herein.

Returning to FIG. 8, the system at step 810 retrieves one or more call associations that pertain to the monitored telephone call. At step 815, the system extracts one or more features from an audio stream of the monitored telephone call. The system extracts the one or more features from the monitored telephone call in accordance with the method of FIG. 6, as described previously herein. At step 820, the system determines a probability that the monitored telephone call is associated with call traffic pumping activity. To determine the probability of traffic pumping activity, the system identifies the entry in the previously stored call traffic pumping classification model having the greatest similarity to the extracted features and retrieved call associations for the monitored call. When the system locates the most similar entry in the classification model, the system returns the probability in the classification model that corresponds to the most similar entry. The system may adjust the probability to a number that is greater than or less than the probability in the classification model based on the degree of similarity between the most similar entry of the classification model and the extracted features and call associations of the monitored call.

Example analyses of monitored telephone calls can be illustrated with respect to the call traffic pumping classification model of FIG. 7 and the monitored calls of FIG. 9. As a first example, the call traffic pumping detection system may monitor phone 950*a*, which was placed to Oak Cleaners after the telephone number was broadcast via distribution channel "radio_ad_1." The system may determine that the audio of monitored phone call 950*a* contains features "p_49," "p_237," "p_17," "p_q7," "p_m4," and "p_d9." The call traffic pumping detection system then searches the stored classification model of Table 700. Because entry 750*b* corresponds to advertiser Oak Cleaners, corresponds to distribution channel "radio_ad_1," and corresponds to at least features "p_49" and "p_17," the call traffic pumping detection system identifies entry 750*b* as the most similar entry for monitored call 950*a* and therefore indicates a corresponding 70% probability that monitored call 950*a* is associated with call traffic pumping activity.

As a second example, the call traffic pumping detection system may monitor a phone call 950*b* that was placed to Town Bank after the telephone number was broadcast via distribution channel "newspaper_ad_4." The system may determine that the audio of monitored phone call 950*b* contains features "p_11," "p_114," "p_7," "p_32," "p_5," and "p_6." The call traffic pumping detection system then searches the stored classification model of Table 700. Because entry 750*d* corresponds to feature "p_114," the call traffic pumping detection system identifies entry 750*d* as the most similar entry for monitored call 950*b* and therefore indicates a corresponding 85% probability that monitored call 950*b* is associated with traffic pumping activity. Note that, in the current example, entry 750*d* corresponds to any advertiser and any distribution channel, and therefore the system would identify entry 750*d* as the most similar entry to monitored call 950*b* regardless of the actual advertiser and distribution channel that are associated with the received call. Note also that the monitored call may contain extra features that are not included in entry 750*d* of the classification model (i.e., p_11, p_7, p_32, p_5, and p_6). In other words, the call traffic pumping detection system may identify an entry as the most similar entry if a monitored call contains all or most of the features of a given entry in the call traffic classification model—regardless of whether the monitored call contains additional features. In such cases, however, the system may adjust the corresponding activity of traffic pumping activity based on the level of similarity. In the present example, the system may reduce the probability of traffic pumping from 85% to 81% to account for the fact that the audio content of monitored call 950b contained extra features that were not included in entry 750d of the classification model.

Returning again to FIG. 8, the system at step 830 retrieves a corrective action threshold. The threshold may be set by a user or a system operator and may be used as a trigger to cause the system to take corrective action to remedy any detected traffic pumping activity. For example, at step 835, the call traffic pumping detection system determines whether the determined probability of traffic pumping activity exceeds the threshold. If the system determines that a monitored telephone call is associated with a probability of call traffic pumping activity that meets or exceeds the threshold, then the system may perform one or more corrective actions at step 840. A corrective action may include any action that serves to mitigate the effects of traffic pumping activity on an impacted party, including terminating the call, presenting an authentication challenge to the caller (e.g., prompting the caller to provide a response to an Interactive Voice Response system), blacklisting telephone calls from the responsible entity, or flagging the call as a high risk call before forwarding to call to the intended recipient. As another example, the call traffic pumping detection system may log the occurrence of the monitored call (including the calculated probability of traffic pumping activity, identified features in the audio stream of the monitored call, associated advertiser, associated distribution channel, time of call, duration of call, or other associated information) to non-volatile memory, or provide a notice to a system operator. In the case of providing a notice to a system operator, such notice may include all or any subset of the information that may be logged. If the call traffic pumping detection system detects that the probability of traffic pumping activity does not exceed a specified threshold at step 835, the system may decline to take corrective action.

In the previous examples of monitored telephone calls 950a and 950b, the classification model indicated a probability of traffic pumping corresponding to 70% and 85%, respectively. Therefore, if a user or system operator set a threshold of 90% for taking corrective action, then no corrective action would be taken with respect to monitored telephone calls 950a and 950b because the actual probability of call traffic pumping activity for each monitored call is only 70% and 85%, respectively, which falls below the 90% corrective action threshold. If, on the other hand, the user or system operator set a threshold of 35% for taking corrective action, then the system would take one or more corrective actions with respect to both monitored calls because the actual probability of call traffic pumping activity for each call exceeds the threshold value of 35%. The corrective action taken by the system may include terminating the monitored call (either before or after the monitored call is forwarded to an intended call recipient), presenting an authentication challenge to the caller (e.g., prompting the caller to provide a response to an Interactive Voice Response system), blacklisting telephone calls from the responsible entity, or flagging the call as a potential traffic pumping call before forwarding the call to the intended recipient. Additionally or alternatively, the system may take any number of actions with respect to a distribution channel associated with the monitored call, including flagging the distribution channel for heightened monitoring or disabling call activity on the distribution channel.

From the foregoing, it will be appreciated that specific embodiments of the invention have been described herein for purposes of illustration, but that various modifications may be made without deviating from the scope of the invention. Those skilled in the art will appreciate that the operations and routines depicted in flowchart blocks and otherwise described herein may be altered in a variety of ways. More specifically, the order of the steps may be re-arranged, steps may be performed in parallel, steps may be omitted, other steps may be included, various combinations or omissions of routines may be made, etc. Accordingly, the invention is not limited except as by the appended claims.

We claim:
1. A method for assessing telephone calls to detect call traffic pumping activity and take corrective action, comprising:
   identifying audio characteristics present in an audio portion of telephone calls in a group of telephone calls;
      wherein each telephone call in the group of telephone calls includes an indication of an associated distribution channel; and
      wherein each telephone call in the group of telephone calls includes an indication of whether or not the call is believed to be associated with call traffic pumping activity;
   determining one or more probabilities of call traffic pumping activity, wherein each determined probability is correlated with a distribution channel and at least one identified audio characteristic;
   receiving a telephone call to assess for call traffic pumping activity, wherein the received telephone call includes an audio portion and is associated with a distribution channel;
   identifying audio characteristics present in the audio portion of the received telephone call;
   assessing a probability that the received telephone call is associated with call traffic pumping activity, wherein the assessing comprises comparing the identified audio characteristics of the received telephone call and the distribution channel that is associated with the received telephone call to the determined probabilities of call traffic pumping activity; and
   executing a corrective action in response to determining that the assessed probability exceeds a threshold.

2. The method of claim 1, wherein the corrective action is flagging the received telephone call as potentially associated with call traffic pumping activity before forwarding the received telephone call to an intended recipient.

3. The method of claim 1, wherein the audio portion of each telephone call corresponds to a beginning portion of the telephone call.

4. The method of claim 1, wherein the determining one or more probabilities of call traffic pumping activity is performed by applying a Random Forest model.

5. The method of claim 1, wherein the identified audio characteristics comprise spectral components that are top principal components present in the audio of the received telephone call.

6. The method of claim 1, wherein the received telephone call is a long distance telephone call that has been routed through multiple local exchange carriers.

7. The method of claim 1, wherein the audio portion of the received telephone is decomposed via Fast Fourier Transform.

8. The method of claim 1, wherein the identified audio characteristics comprise spectral components that correspond to the top three principal components present in the audio portion of the telephone call.

9. The method of claim 1, wherein the corrective action is providing a notice to a system operator that the received telephone call is potentially associated with call traffic pumping activity, or logging details of the received telephone to non-volatile memory, wherein the logged details include at least the assessed probability that the received telephone call is associated with call traffic pumping activity.

10. The method of claim 3, wherein the audio portion of the telephone call is perceptible as silence to a human listener.

11. A non-transitory computer-readable storage medium with instructions stored thereon that, when executed by a computing system, cause the computing system to perform a method to assess telephone calls to detect call traffic pumping activity and take corrective action, the method comprising:
 identifying audio characteristics present in an audio portion of telephone calls in a group of telephone calls;
  wherein each telephone call in the group of telephone calls includes an indication of an associated distribution channel; and
  wherein each telephone call in the group of telephone calls includes an indication of whether or not the call is believed to be associated with call traffic pumping activity;
 determining one or more probabilities of call traffic pumping activity, wherein each determined probability is correlated with a distribution channel and at least one identified audio characteristic;
 receiving a telephone call to assess for call traffic pumping activity, wherein the received telephone call includes an audio portion and is associated with a distribution channel;
 identifying audio characteristics present in the audio portion of the received telephone call;
 assessing a probability that the received telephone call is associated with call traffic pumping activity, wherein the assessing comprises comparing the identified audio characteristics of the received telephone call and the distribution channel that is associated with the received telephone call to the determined probabilities of call traffic pumping activity; and
 executing a corrective action in response to determining that the assessed probability exceeds a threshold.

12. The non-transitory computer-readable storage medium of claim 11, wherein the corrective action is flagging the received telephone call as potentially associated with call traffic pumping activity before forwarding the received telephone call to an intended recipient.

13. The non-transitory computer-readable storage medium of claim 11, wherein the audio portion of each telephone call corresponds to a beginning portion of the telephone call.

14. The non-transitory computer-readable storage medium of claim 11, wherein the determining one or more probabilities of call traffic pumping activity is performed by applying a Random Forest model.

15. The non-transitory computer-readable storage medium of claim 11, wherein the identified audio characteristics comprise spectral components that are top principal components present in the audio portion of the received telephone call.

16. The non-transitory computer-readable storage medium of claim 11, wherein the received telephone call is a long distance telephone call that has been routed through multiple local exchange carriers.

17. The non-transitory computer-readable storage medium of claim 11, wherein the audio portion of the received telephone is decomposed via Fast Fourier Transform.

18. The non-transitory computer-readable storage medium of claim 11, wherein the identified audio characteristics comprise spectral components that correspond to the top three principal components present in the audio portion of the telephone call.

19. The non-transitory computer-readable storage medium of claim 11, wherein the corrective action is providing a notice to a system operator that the received telephone call is potentially associated with call traffic pumping activity, or logging details of the received telephone to non-volatile memory, wherein the logged details include at least the assessed probability that the received telephone call is associated with call traffic pumping activity.

20. The non-transitory computer-readable storage medium of claim 13, wherein the audio portion of the telephone call is perceptible as silence to a human listener.

* * * * *